(12) United States Patent
Aoki et al.

(10) Patent No.: US 12,619,138 B2
(45) Date of Patent: May 5, 2026

(54) ILLUMINATOR AND PROJECTOR

(71) Applicant: SEIKO EPSON CORPORATION, Tokyo (JP)

(72) Inventors: Shigekazu Aoki, Matsumoto-Shi (JP); Shoichi Uchiyama, Shimosuwa-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 129 days.

(21) Appl. No.: 18/785,099

(22) Filed: Jul. 26, 2024

(65) Prior Publication Data

US 2025/0036017 A1 Jan. 30, 2025

(30) Foreign Application Priority Data

Jul. 27, 2023 (JP) ................................. 2023-122866

(51) Int. Cl.
*G03B 21/20* (2006.01)
*H04N 9/31* (2006.01)

(52) U.S. Cl.
CPC ........... *G03B 21/208* (2013.01); *H04N 9/312* (2013.01); *H04N 9/3155* (2013.01)

(58) Field of Classification Search
CPC .... G03B 21/208; H04N 9/312; H04N 9/3155; H04N 9/3152
See application file for complete search history.

(56) References Cited

U.S. PATENT DOCUMENTS

| 3,765,749 | A | * | 10/1973 | LaMacchia | .......... G11C 13/048 |
| | | | | | 365/126 |
| 5,270,859 | A | * | 12/1993 | Wirth | ................... G02B 3/0056 |
| | | | | | 359/422 |
| 2013/0201424 | A1 | | 8/2013 | Uchida et al. | |
| 2016/0062223 | A1 | * | 3/2016 | Akiyama | ........... G03B 21/2013 |
| | | | | | 353/31 |
| 2016/0241825 | A1 | | 8/2016 | Inoko | |
| 2018/0210211 | A1 | * | 7/2018 | Akiyama | ........... G03B 21/2033 |
| 2018/0210329 | A1 | | 7/2018 | Sakata | |
| 2020/0218077 | A1 | | 7/2020 | Li et al. | |
| 2021/0157039 | A1 | | 5/2021 | Akiyama | |

(Continued)

FOREIGN PATENT DOCUMENTS

| JP | 2015-145943 A | 8/2015 |
| JP | 2018-120672 A | 8/2018 |

(Continued)

*Primary Examiner* — Sonji N Johnson
(74) *Attorney, Agent, or Firm* — Dority & Manning, P.A.

(57) ABSTRACT

An illuminator includes a light source that emits light; a collimator that parallelizes the light emitted from the light source; a first lens array that receives the light parallelized by the collimator and includes multiple first lenslets; a second lens array that receives light emitted from the first lens array and includes multiple second lenslets; and a light condenser that focuses light emitted from the second lens array at an illuminated region. The light emitted from each of at least two of the first lenslets is incident on one of the second lenslets. A focal plane of the multiple second lenslets is located in an optical path along which the light travels and located upstream from an imaginary plane containing multiple contact points where the first lenslets adjacent to each other in the first lens array are in contact with each other.

8 Claims, 6 Drawing Sheets

(56)               References Cited

U.S. PATENT DOCUMENTS

| 2022/0057701 | A1 | 2/2022 | Uehara |
| 2022/0066306 | A1 | 3/2022 | Uehara |

FOREIGN PATENT DOCUMENTS

| JP | 2021-085899 A | 6/2021 |
| JP | 2022-034731 A | 3/2022 |
| JP | 2022-037336 A | 3/2022 |
| JP | 2022-051831 A | 4/2022 |
| WO | WO 2011/135755 A | 11/2011 |

* cited by examiner

ILLUMINATOR AND PROJECTOR

The present application is based on, and claims priority from JP Application Serial Number 2023-122866, filed Jul. 27, 2023, the disclosure of which is hereby incorporated by reference herein in its entirety.

BACKGROUND

1. Technical Field

The present disclosure relates to an illuminator and a projector.

2. Related Art

A display apparatus that projects an image or a video on a projection surface such as a screen, like a projector, performs region segmentation illumination in some cases. In the region segmentation illumination, for example, the light output from a light source is divided into multiple sub-luminous fluxes in a plane that intersects with the optical axis of the light, and the multiple sub-luminous fluxes are radiated onto the illuminated region of a light modulator disposed downstream from the light source.

For example, an illuminator of a projector disclosed in JP-A-2022-034731 includes a first lens array that divides light output from an optical apparatus into multiple sub-luminous fluxes, and a second lens array that contributes to radiation of the light output from the first lens array and having a uniform illuminance distribution onto an image formation region of a light modulator. In the illuminator disclosed in JP-A-2022-034731, the focal plane of the second lens array disposed downstream from the first lens array is located at a position shifted from the light incident surface of the first lens array toward the light exiting surface thereof. In the projector disclosed in JP-A-2022-034731, an illuminated region corresponding to a light incident region of a wavelength converter has a lattice-shaped region that includes a central portion and is not irradiated with the light. Heat is therefore readily dissipated in the region that is not irradiated with the light, so that the difference in temperature in the illuminated region is reduced, and a decrease in light use efficiency is suppressed.

JP-A-2022-034731 is an example of the related art.

In the illuminator disclosed in JP-A-2022-034731, the illuminance in the region of the illuminated region that is not irradiated with the light is lower than the illuminance in the region around the non-illuminated region. When the region segmentation illumination described above is applied to the image formation region of the light modulator of the projector as the illuminated region, a lattice-shaped portion that is not illuminated with the light and therefore has a low optical intensity and illuminance is created between regions illuminated with the multiple sub-luminous fluxes in the image formation region of the light modulator. It is difficult to recover the illuminance having already decreased in the image formation region of the light modulator at a downstream position in the optical path along which the light travels, so that the lattice-shaped dark portion stands out in a projection image and the quality of the projection image therefore decreases in some cases, and improvement in the image quality is therefore desired.

SUMMARY

An illuminator according to an aspect of the present disclosure includes: a light source configured to emit light;

a collimator configured to parallelize the light emitted from the light source; a first lens array configured to receive the light parallelized by the collimator and including multiple first lenslets; a second lens array configured to receive light output from the first lens array and including multiple second lenslets; and a light condenser configured to focus light emitted from the second lens array at an illuminated region. The light emitted from each of at least two of the first lenslets is incident on one of the second lenslets, and a focal plane of the multiple second lenslets is located in an optical path along which the light travels and located upstream from an imaginary plane containing multiple contact points where the first lenslets adjacent to each other in the first lens array are in contact with each other.

DESCRIPTION OF EMBODIMENTS

Figure 1:
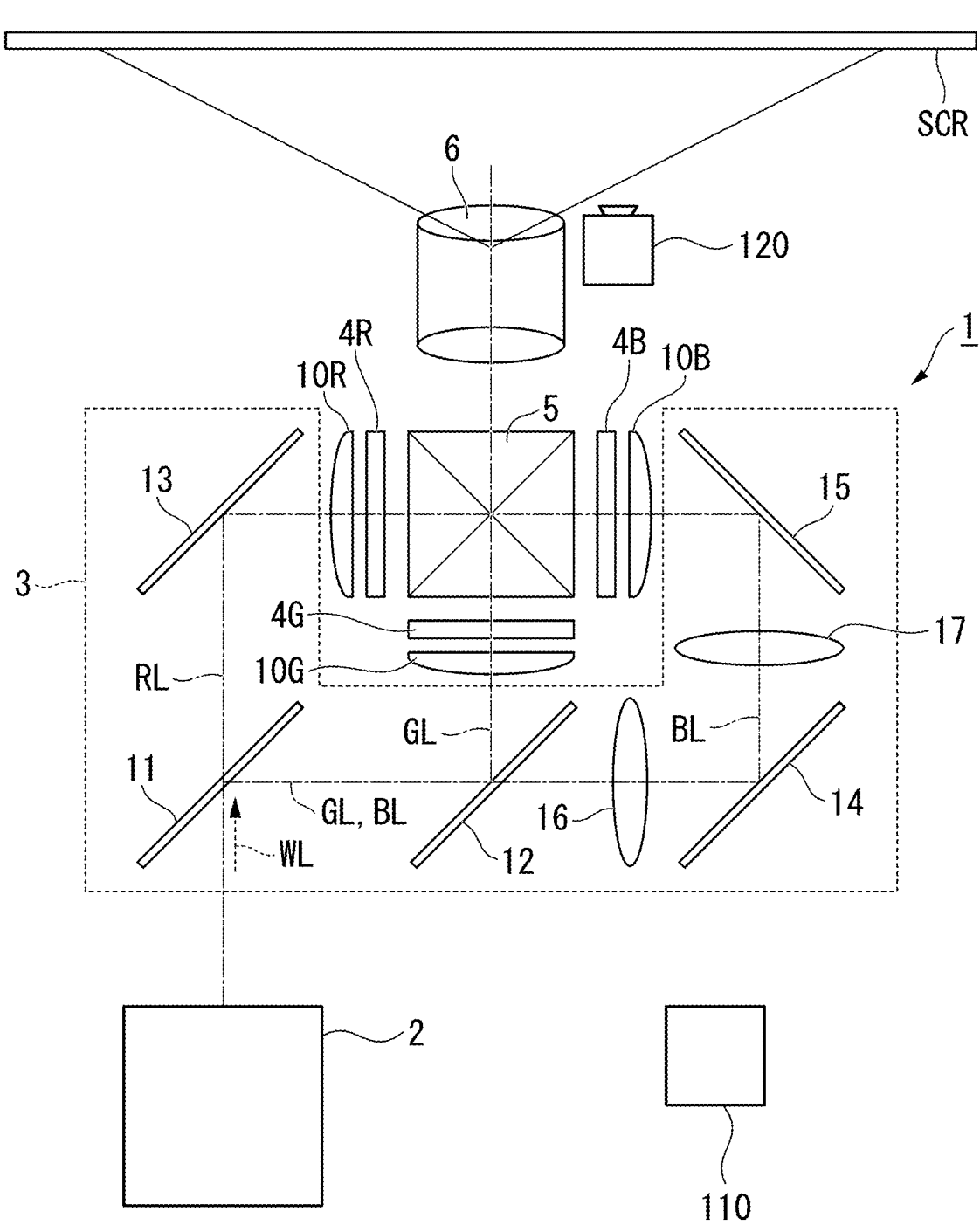
FIG. 1 is a schematic view showing the configuration of a projector according to an embodiment.

An embodiment of the present disclosure will be described below with reference to the drawings. In the drawings, components are drawn at different dimensional scales in some cases for clarity of each of the components.

A projector according to an embodiment of the present disclosure will first be described with reference to FIG. 1. FIG. 1 is a schematic view showing the configuration of a projector 1 according to the embodiment of the present disclosure. The projector 1 is a projection-type display apparatus that displays an image and a video on a screen SCR. The projector 1 includes an illuminator 2, a color separation system 3, light modulators 4R, 4G, and 4B, a light combining system 5, a projection system 6, a controller 110, and an imager 120. The projector 1 is a three-panel projector including three light modulators.

The illuminator 2 outputs white light WL toward the color separation system 3. The white light WL is illumination light in the projector 1, and contains red light RL, green light GL, and blue light BL. The configuration of the illuminator 2 will be described later.

The color separation system 3 separates the white light WL into the red light RL, the green light GL, and the blue light BL. The color separation system 3 includes, for example, a first dichroic mirror 11, a second dichroic mirror 12, a first total reflection mirror 13, a second total reflection mirror 14, a third total reflection mirror 15, a first relay lens 16, and a second relay lens 17.

The first dichroic mirror 11 is disposed in the optical path of the white light WL output from the illuminator 2, and separates the incident white light WL into the red light RL and light containing the green light GL and the blue light BL. The first dichroic mirror 11 transmits the red light RL and reflects the green light GL and the blue light BL. The second dichroic mirror 12 is disposed in the optical path common to the green light GL and the blue light BL output from the first dichroic mirror 11, and separates the green light GL and the blue light BL from each other. The second dichroic mirror 12 transmits the blue light BL and reflects the green light GL.

The first total reflection mirror 13 reflects the red light RL toward the light modulator 4R. The second total reflection mirror 14 and the third total reflection mirror 15 guide the blue light BL to the light modulator 4B. The green light GL is reflected off the second dichroic mirror 12 toward the light modulator 4G. The red light RL, the green light GL, and the blue light BL contained in the white light WL correspond to the light output from the illuminator 2.

The first relay lens 16 is disposed in the optical path of the blue light BL between the second dichroic mirror 12 and the second total reflection mirror 14. The second relay lens 17 is disposed in the optical path of the blue light BL between the second total reflection mirror 14 and the third total reflection mirror 15. The optical path length of the blue light BL from the first dichroic mirror 11 to the light modulator 4B is longer than the optical path length of the red light RL from the first dichroic mirror 11 to the light modulator 4R and the optical path length of the green light GL from the first dichroic mirror 11 to the light modulator 4G. Therefore, if no relay lens is disposed in the optical path of the blue light BL, the optical loss of the blue light BL is greater than the optical loss of the red light RL and the green light GL. The aforementioned arrangement of the first relay lens 16 and the second relay lens 17 compensates for the optical loss of the blue light BL.

The light modulator 4R is disposed in the optical path of the red light RL reflected off the first total reflection mirror 13 and output from the first total reflection mirror 13. The light modulator 4R modulates the red light RL incident thereon in accordance with image information input from an image input apparatus, which is not shown, to form red image light and outputs the red image light. The light modulator 4G is disposed in the optical path of the green light GL reflected off the second dichroic mirror 12 and output from the second dichroic mirror 12. The light modulator 4G modulates the green light GL incident thereon in accordance with image information input from the image input apparatus, which is not shown, to form green image light and outputs the green image light. The light modulator 4B is disposed in the optical path of the blue light BL reflected off the third total reflection mirror 15 and output from the third total reflection mirror 15. The light modulator 4B modulates the blue light BL incident thereon in accordance with image information input from the image input apparatus, which is not shown, to form blue image light and outputs the blue image light. The image input apparatus is, for example, a personal computer or a portable terminal device.

The light modulators 4R, 4G, and 4B are each, for example, a transmissive liquid crystal panel. Polarizers that are not shown are disposed at the light incident and exiting sides of each of the liquid crystal panels. A field lens 10R is disposed in the optical path of the red light RL between the first total reflection mirror 13 and the light modulator 4R. A field lens 10G is disposed in the optical path of the green light GL between the second dichroic mirror 12 and the light modulator 4G. A field lens 10B is disposed in the optical path of the blue light BL between the third total reflection mirror 15 and the light modulator 4B.

The light combining system 5 is disposed so as to lie on the optical path of the red image light output from the light modulator 4R, the optical path of the green image light output from the light modulator 4G, and the optical path of the blue image light output from the light modulator 4B. In the plan view or the side view as shown in FIG. 1, the position where the light combining system 5 combines the three types of color light with each other coincides with the intersection of the optical path of the red image light, the optical path of the green image light, and the optical path of the blue image light. The light combining system 5 combines the red image light, the green image light, and the blue image light with each other to form color image light. The light combining system 5 outputs the color image light. The light combining system 5 is, for example, a cross dichroic prism.

The projection system 6 is disposed in the optical path of the color image light output from the light combining system 5. The color image light output from the light combining system 5 corresponds to the light modulated by the light modulators 4R, 4G, and 4B. The projection system 6 enlarges the color image light output from the light combining system 5 and entering the projection system 6, and projects the enlarged color image light toward the screen SCR. The color image light enlarged and projected by the projection system 6 is displayed as a color video on a display surface of the screen SCR that is a surface facing a light exiting surface of the projection system 6.

The projection system 6 is formed, for example, of multiple optical lenses, and may instead be formed of a single optical lens. Examples of the optical lenses may include a variety of lenses, such as a planoconvex lens, a biconvex lens, a meniscus lens, an aspherical lens, a rod lens, and a freeform surface lens.

The controller 110 is electrically coupled to the liquid crystal panels of the light modulators 4R, 4G, and 4B. The controller 110 is formed of a computer or an integrated circuit, for example, a processor, having a built-in program including processes carried out by drivers that drive the imager 120, a light source 21, and the light modulators 4R, 4G, and 4B. The controller 110 receives data on an image of a projection target from the image input apparatus such as a computer, which is not shown, can change data on the luminance of each pixel of the liquid crystal panel of each of the light modulators 4R, 4G, and 4B, and controls information on the luminance of the liquid crystal panel. The controller 110 may also be accommodated in the internal space of an exterior body of the projector 1, as the illuminator 2, the color separation system 3, the light modulators 4R, 4G, and 4B, the light combining system 5, the projection system 6, and other components, or may be disposed outside the exterior body and communicable with the light modulators 4R, 4G, and 4B.

The imager 120 captures in real time projection image containing the image light projected by the projection system 6. The imager 120 is, for example, a small imaging camera. The imager 120 is disposed so as not to block the image light output from the projection system 6, and disposed, for example, on a surface of the exterior body of the projector 1 that is the surface opposite from the surface facing a surface on which the projector 1 is installed. The imaging surface of the imager 120 faces the screen SCR. Image data captured by the imager 120 and a result of the imaging performed by the imager 120 are directly or indirectly transmitted to the controller 110.

Figure 2:
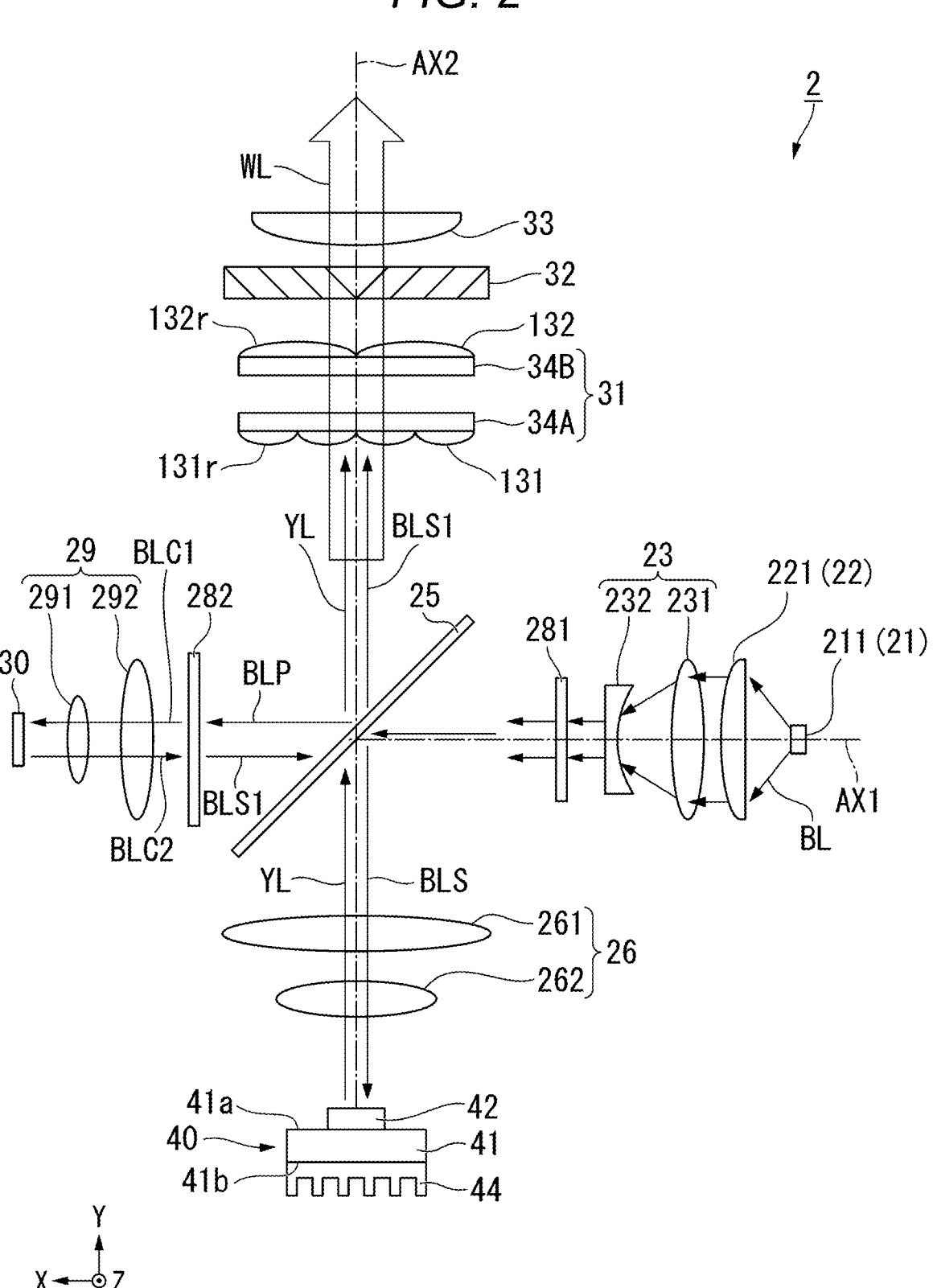
FIG. 2 is a schematic view of an illuminator of the projector shown in FIG. 1.

An illuminator according to the embodiment of the present disclosure will subsequently be described with reference to FIGS. 2 to 4. FIG. 2 is a schematic view showing the configuration of the illuminator 2 according to the embodiment of the present disclosure. The illuminator 2 includes the light source 21, a collimator 22, an afocal system 23, a first phase retarder 281, a wavelength converter 40, a polarization separator 25, a first focusing system 26, a second phase retarder 282, a second focusing system 29, a diffusive reflector 30, an optical integration system 31, a polarization converter 32, and a superimposing lens 33.

In an orthogonal coordinate system used in FIG. 2, an axis along the chief ray of the blue light BL output from the light source 21 is called an optical axis AX1, and an axis parallel to the optical axis AX1 is called an X-axis. An axis along the chief ray of yellow light YL output from the wavelength converter 40 is called an optical axis AX2, and an axis parallel to the optical axis AX2 is called a Y-axis. An axis perpendicular to the X-axis and the Y-axis is called a Z-axis.

The light source 21, the collimator 22, the afocal system 23, the first phase retarder the polarization separator 25, the second phase retarder 282, the second focusing system 29, and the diffusive reflector 30 are sequentially arranged on the optical axis AX1. The wavelength converter 40, the first focusing system 26, the polarization separator 25, the optical integration system 31, the polarization converter 32, and the superimposing lens 33 are sequentially arranged on the optical axis AX2. The optical axes AX1 and AX2 are present in the same plane and perpendicular to each other.

The light source 21 outputs the blue light BL. The blue light BL is color light that constitutes the white light WL output from the illuminator 2, and is also excitation light with which the wavelength converter 40 is irradiated. In the present embodiment, the light source 21 includes one light emitter 211, which emits the blue light BL. The light emitter 211 is a semiconductor laser device that emits the blue light BL. The semiconductor laser device emits blue light having a wavelength band that belongs at least to blue in the visible wavelength band. The peak wavelength of the blue light BL is, for example, 460 nm. The blue light BL corresponds to "light" output by the light source 21.

The light source 21 may include multiple light emitters 211. For example, the multiple light emitters 211 may be arranged in an array in a plane perpendicular to the optical axis AX1. For example, four light source units in each of which four light emitters 211 are arranged in a line along the Y-axis may be arranged along the Z-axis. That is, the light source 21 may include 16 light emitters 211 arranged in a matrix of four rows and four columns. The number of light emitters 211 and the arrangement thereof are not limited to those described above, and may be changed as appropriate.

The blue light BL output from the light source 21 enters the collimator 22. The collimator 22 parallelizes the blue light BL output from the light source 21 to convert the blue light BL into substantially parallelized light. The collimator 22 includes one collimation lens 221. The collimation lens 221 is, for example, a planoconvex lens having a flat surface perpendicular to the optical axis AX1 at the light incident side and a convex curved surface at the light exiting side. The collimator 22 is formed, for example, of a planoconvex lens, and may instead be an optical element having a collimation function other than a planoconvex lens, or a biconvex lens, or may still instead be formed of multiple optical lenses.

As described above, when the light source 21 includes the multiple light emitters 211 arranged in a matrix in a plane perpendicular to the optical axis AX1, the collimator 22 includes multiple collimation lenses 221 arranged in a matrix in a plane perpendicular to the optical axis AX1 in correspondence with the multiple light emitters 211. Each of the collimation lenses 221 is disposed at a position where the blue light BL emitted from the corresponding one of the light emitters 211 is incident on the collimation lens 221.

The blue light BL output from the collimator 22 enters the afocal system 23. The afocal system 23 adjusts the beam diameter of the blue light BL. The afocal system 23 includes, for example, a biconvex lens 231 and a planoconcave lens 232 disposed at the light exiting side of the biconvex lens 231.

The blue light BL output from the afocal system 23 enters the first phase retarder 281. The first phase retarder 281 is formed, for example, of a half-wave plate rotatable around an axis of rotation parallel to the optical axis AX1. The blue light BL immediately after output from the light source 21 is linearly polarized light having a predetermined polarization direction. Appropriately setting the angle of rotation of the first phase retarder 281 allows the blue light BL, which is linearly polarized light, to pass through the first phase retarder 281 and then to be converted into blue light BL containing an S-polarized component and a P-polarized component mixed with each other at a predetermined ratio corresponding to the polarization separator 25. The ratio between the S-polarized component and the P-polarized component can be adjusted by changing the angle of rotation of the first phase retarder 281.

The blue light BL output from the first phase retarder 281 and containing the S-polarized and P-polarized components is incident on the polarization separator 25. The polarization separator 25 is formed, for example, of a plate-shaped polarization beam splitter having wavelength selectivity. A polarization separation film that is not shown is provided at a plate surface of the polarization separator 25. The polarization separator 25 is disposed so as to incline by an angle of 45° with respect to the optical axes AX1 and AX2.

The polarization separator 25 separates the blue light BL incident thereon into blue light BLS, which is formed of the S-polarized component with respect to the polarization separator 25, and blue light BLP, which is formed of the P-polarized component with respect to the polarization separator 25. Specifically, the polarization separator 25 reflects the blue light BLS formed of the S-polarized component and guides the reflected blue light BLS to the wavelength converter 40, and transmits the blue light BLP formed of the P-polarized component and guides the transmitted blue light BLP to the diffusive reflector 30. The polarization separator 25 has a color separation function of transmitting yellow light having a wavelength band different from that of the blue light BL irrespective of the polarization state of the yellow light, in addition to the function of separating the blue light BL in terms of polarization.

The S-polarized blue light BLS reflected off the polarization separator 25 enters the first focusing system 26. The first focusing system 26 focuses the blue light BLS output from the polarization separator 25 at the wavelength converter 40. The first focusing system 26 includes a first lens 261 and a second lens 262. The first lens 261 and the second lens 262 are each, for example, a biconvex lens. The blue light BLS output from the first focusing system 26 is incident on the wavelength converter 40 while being focused along the optical axis AX2.

The wavelength converter 40 includes a base 41, a wavelength conversion layer 42, and a heat sink 44. The wavelength conversion layer 42 is bonded to a first surface 41a of the base 41 via a bonding material (not shown). The bonding material is, for example, a nano-silver sintered metal material. The base 41 is, for example, made of a metal material having high light reflectance, such as aluminum and silver. The first surface 41*a* of the base 41 reflects the light that travels in the interior of the wavelength conversion layer 42. A reflection layer that is not shown may be provided between the base 41 and the wavelength conversion layer 42.

The wavelength conversion layer 42 is made of a phosphor. In the present embodiment, an immobile wavelength converter is used as the wavelength converter 40. The immobile wavelength converter does not include a driving source such as a motor, and is therefore not rotatable. The blue light BLS focused by the first lens 261 and the second lens 262 is incident on the wavelength converter 40.

The wavelength conversion layer 42 contains a ceramic phosphor that converts the blue light BLS into the yellow light YL, which is fluorescence. The yellow light YL has a wavelength band different at least from the wavelength band of the blue light BL and BLS, for example, a wavelength band ranging from 490 to 750 nm. The yellow light YL contains green light and red light. The wavelength conversion layer 42 contains, for example, an yttrium-aluminum-garnet-based (YAG-based) phosphor. An example of the YAG-based phosphor may include YAG:Ce containing cerium (Ce) as an activator. YAG:Ce is made, for example, of a material produced by mixing raw powder materials containing $Y_2O_3$, $Al_2O_3$, $CeO_3$, and other elements with each other and causing the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method. The wavelength conversion layer 42 may contain a scattering element formed, for example, of multiple bubbles. When the wavelength conversion layer 42 contains such a scattering element, the efficiency at which the yellow light YL is extracted increases.

The heat sink 44 is provided at a second surface 41*b* of the base 41 that is the surface opposite from the first surface 41*a*. The heat sink 44 includes multiple fins. The heat sink 44 is fixed to the base 41, for example, by metal bonding. In the wavelength converter 40, since heat of the wavelength conversion layer 42 is dissipated via the heat sink 44, thermal deterioration of the wavelength conversion layer 42 is suppressed.

The yellow light YL generated by the wavelength converter 40 is emitted along the optical axis AX2 in the opposite direction of the direction in which the blue light BLS is incident, substantially parallelized by the first focusing system 26, and then incident on the polarization separator 25. Since the polarization separator 25 is characterized n that it transmits the yellow light irrespective of the polarization state thereof, as described above, the yellow light YL passes through the polarization separator 25.

On the other hand, the P-polarized blue light BLP output from the polarization separator 25 enters the second phase retarder 282. The second phase retarder 282 is disposed in the optical path of the blue light BLP between the polarization separator 25 and the diffusive reflector 30. The second phase retarder 282 is formed, for example, of a quarter wave plate. The P-polarized blue light BLP output from the polarization separator 25 is converted by the second phase retarder 282, for example, into right-handed circularly polarized blue light BLC1 polarized around the optical axis AX1, which then enters the second focusing system 29.

The second focusing system 29 includes a first lens 291 and a second lens 292. The first lens 291 and the second lens 292 are each formed of a biconvex lens. The second focusing system 29 is formed, for example, of two biconvex lenses, and may instead be optical elements having a light focusing function other than biconvex lenses, or planoconvex lenses, or may still instead be formed of a single optical lens. The second focusing system 29 causes the blue light BLC1 to be incident in the form of focused light on the diffusive reflector 30.

The diffusive reflector 30 is disposed in the optical path of the blue light BLP output from the polarization separator 25. The diffusive reflector 30 diffusively reflects the blue light BLC1 output from the second focusing system 29 toward the polarization separator 25. The diffusive reflector 30 preferably reflects the blue light BLC1 having an angular distribution close to that of Lambert diffusion around the optical axis AX1. It is preferable that the polarization state of the blue light BLC1 is not disturbed by the diffusive reflector 30.

The light diffusively reflected off the diffusive reflector 30 is referred to as blue light BLC2. In the present embodiment, diffusively reflecting the blue light BLC1 results in blue light BLC2 having a substantially uniform illuminance distribution. For example, the diffusive reflector 30 diffusively reflects the right-handed circularly polarized blue light BLC1 polarized around the optical axis AX1 into left-handed circularly polarized blue light BLC2 polarized around the optical axis AX1.

The blue light BLC2 is converted by the second focusing system 29 into parallelized light and then enters the second phase retarder 282 again. The left-handed circularly polarized blue light BLC2 is converted by the second phase retarder 282 into S-polarization blue light BLS1. The S-polarized blue light BLS1 is reflected off the polarization separator 25 toward the optical integration system 31.

The blue light BLS1 is combined with the yellow light YL output from the polarization separator 25 to produce the white light WL. That is, the blue light BLS1 and the yellow light YL are output from the polarization separator 25 in the same direction to produce the white light WL, which is the combination of the blue light BLS1 and the yellow light YL.

The white light WL, which is illumination light, exits toward the optical integration system 31. The optical integration system 31 includes a first lens array 34A and a second lens array 34B. The white light WL containing the blue light BL output from the light source 21 and parallelized by the collimator 22 enters the first lens array 34A. The first lens array 34A includes multiple first lenslets 131. The multiple first lenslets 131 are arranged in a matrix in a plane perpendicular to the optical axis AX2. In the present embodiment, the first lenslets 131 are each a planoconvex lens having a convex curved surface at the light incident side and a planar surface at the light exiting side. That is, the multiple first lenslets 131 each have a first lens surface 131*r*, which is a convex curved surface protruding toward the light incident side. The first lens surface 131*r* corresponds to a first curved surface. The white light WL having entered the first lens array 34A is divided into sub-luminous fluxes the number of which is equal to the number of first lenslets 131, and output from the first lens array 34A toward the second lens array 34B.

The second lens array 34B is disposed in the optical paths of the multiple sub-luminous fluxes of the white light WL output from the first lens array 34A. The multiple sub-luminous fluxes of the white light WL output from the first lens array 34A enter the second lens array 34B. The multiple sub-luminous fluxes of the white light WL correspond to light output from the first lens array. The second lens array 34B includes multiple second lenslets 132. The multiple second lenslets 132 are arranged in a matrix in a plane perpendicular to the optical axis AX2. In the present embodiment, the second lenslets 132 are each a planoconvex lens having a planar surface at the light incident side and a convex curved surface at the light exiting side. That is, the multiple second lenslets 132 each have a second lens surface 132r, which is a convex curved surface protruding toward the light exiting side. The second lens surface 132r corresponds to a second curved surface. The diameter of each of the second lenslets 132 is an integral multiple of that of each of the first lenslets 131, for example, about twice that of each of the first lenslets 131. When viewed along the optical axis AX2 and the Y-axis, two first lenslets 131 coincide with one second lenslet 132.

The white light WL output from the optical integration system 31 enters the polarization converter 32. The polarization converter 32 includes polarization separation films and phase retarders, neither of which is shown. The polarization converter 32 converts the white light WL containing the non-polarized yellow light YL into linearly polarized light to be incident on the light modulators 4R, 4G, and 4B. Specifically, the polarization converter 32 converts the white light WL into linearly polarized light having a polarization direction corresponding to the transmission axis of the light-incident-side polarizer of each of the light modulators 4R, 4G, and 4B.

The white light WL output from the polarization converter 32 enters the superimposing lens 33. The superimposing lens 33, in cooperation with the optical integration system 31, homogenizes the illuminance distribution of the white light WL in an image formation region of each of the light modulators 4R, 4G, and 4B. The optical integration system 31 and the superimposing lens 33 constitute a superimposing system. The illuminator 2 thus produces the white light WL. The superimposing lens 33 corresponds to a light condenser. The white light WL output from the polarization converter 32 corresponds to light output from the second lens array 34B. The image formation region of each of the light modulators 4R, 4G, and 4B corresponds to an illuminated region.

Figure 3:
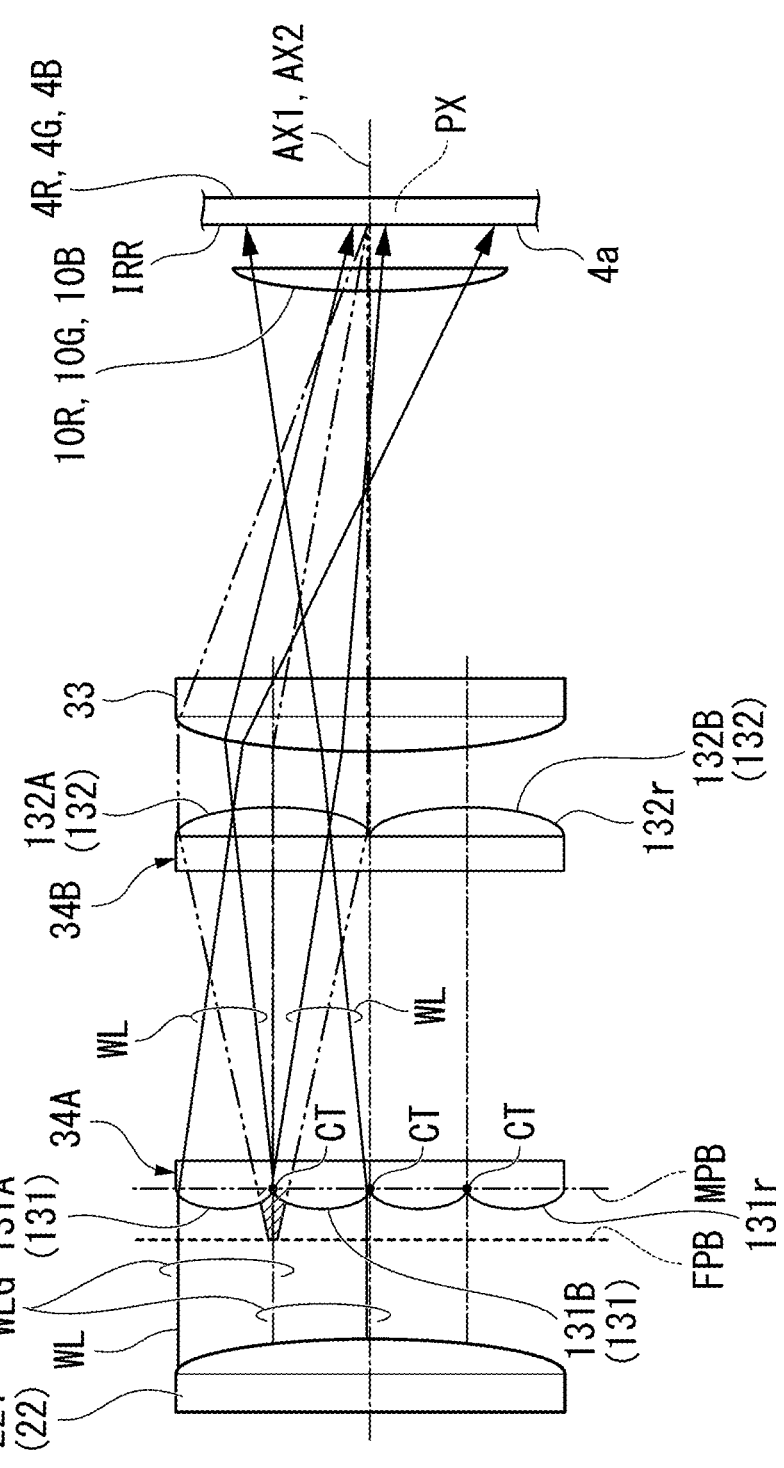
FIG. 3 is a schematic view of key parts of the projector shown in FIG. 1.

FIG. 3 is a schematic view of key parts relating to the region segmentation illumination in the projector 1 according to the embodiment. The white light WL containing the blue light BL output from and parallelized by the collimation lens 221, which is the collimator 22, passes through a variety of optical elements neither of which is shown and enters the multiple first lenslets 131 of the first lens array 34A, as shown in FIG. 3. The multiple first lenslets 131 focus the white light WL having entered the first lenslets 131 at the second lenslets 132 of the second lens array 34B. The white light WL focused at the second lenslets 132 diverges again from the positions where the white light WL is focused is separated by the color separation system 3, which is omitted in FIG. 3, in terms of color, is refracted by the superimposing lens 33 and the field lenses 10R, 10G, and 10B, and is radiated onto the image formation region of a light incident surface 4a of each of the light modulators 4R, 4G, and 4B, that is, an illuminated region IRR.

The white light WL output from at least two first lenslets 131 enters one second lenslet 132. In the present embodiment, for example, the white light WL incident on four first lenslets 131 arranged in two rows and two columns adjacent to each other in a plane perpendicular to the optical axis AX2 is focused at a common one second lenslet 132. That is, the white light WL output from the two to four first lenslets 131 enters one second lenslet 132.

A focal plane FPB of the second lens array 34B is located at least in a light-incident-side region of the first lens array 34A in the optical path along which the white light WL travels and the optical axis AX2, specifically, a region shifted from a reference plane MPB of the first lens array 34A toward the light incident side, that is, a region upstream from the reference plane MPB. The reference plane MPB is an imaginary plane containing multiple contact points CT, where the first lenslets 131 adjacent to each other are in contact with each other in the first lens array 34A, and is substantially perpendicular to the optical axis AX2.

The multiple first lenslets 131 of the first lens array 34A are responsible for dividing the white light WL incident on the first lens array 34A into white luminous fluxes WLG, which are sub-luminous fluxes, as described above. Since the focal plane FPB is located at a position shifted from the reference plane MPB toward the light incident side of the white light WL along the optical axis AX2, a portion of one of the white luminous fluxes WLG adjacent to each other in a plane perpendicular to the optical axis AX2 that is the portion facing the other white luminous flux WLG overlaps with the other white luminous flux WLG. The region where the white luminous fluxes WLG adjacent to each other overlap with each other as described above corresponds to the region hatched in FIG. 3.

Figure 4:
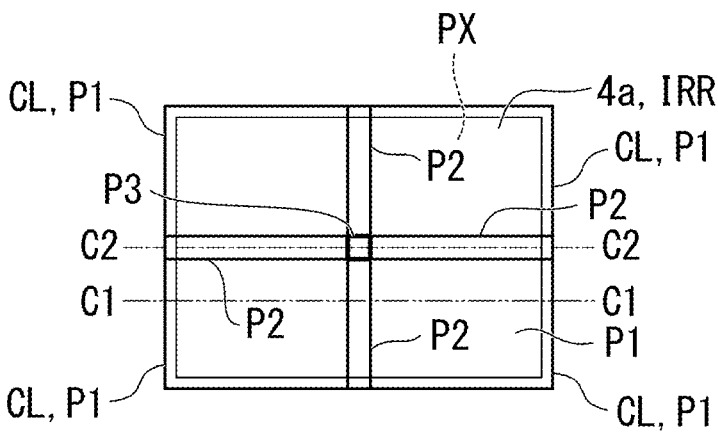
FIG. 4 is a schematic view of a part of a light incident surface of a light modulator of the projector shown in FIG. 1.

FIG. 4 is a schematic view of the light incident surface 4a of each of the light modulators 4R, 4G, and 4B with the image formation region of the light incident surface 4a viewed from the front side along the optical axis of the red light RL contained in the white light WL. The light incident surface 4a of each of the light modulators 4R, 4G, and 4B corresponds to the illuminated region IRR illuminated with color light CL separated in terms of color from the white light WL, as shown in FIG. 4. The illuminated region IRR is provided, for example, with multiple pixels PX of each of the light modulators 4R, 4G, and 4B.

Part of the color light CL separated in terms of color from the white light WL output from a first lenslet 131A, which is one of the multiple first lenslets 131 of the first lens array 34A, and part of the color light CL separated in terms of color from the white light WL output from a first lenslet 131B, which is another of the multiple first lenslets 131, overlap with each other in the illuminated region IRR, as shown in FIGS. 3 and 4. When the illuminated region IRR includes the image formation region of the light modulator 4R, which generates the red image light, the color light CL is the red light RL. When the illuminated region IRR includes the image formation region of the light modulator 4G, which generates the green image light, the color light CL is the green light GL. When the illuminated region IRR includes the image formation region of the light modulator 4B, which generates the blue image light, the color light CL is the blue light BL. The color light CL of the white light WL output from the first lenslet 131A corresponds to first illumination light. The color light CL of the white light WL output from the first lenslet 131B corresponds to second illumination light.

In the illuminated region IRR, a region P1 is the region irradiated with the color light CL of the white light WL output from only one of the multiple first lenslets 131, as shown in FIG. 4. That is, the region P1 is a region where the color light CL (illumination light) does not overlap with other color light CL in the illuminated region IRR. In the illuminated region IRR, a region P2 is the region irradiated with the color light CL of the white light WL output from two of the multiple first lenslets 131. That is, the region P2 is a region where two kinds of color light CL (illumination light) overlap with each other in the illuminated region IRR. In the illuminated region IRR, a region P3 is the region irradiated with the color light CL of the white light WL output from four of the multiple first lenslets 131. That is, the region P3 is a region where four kinds of color light CL (illumination light) overlap with each other in the illuminated region IRR. The regions P2 and P3 are overlapping regions.

When the optical intensity and illuminance of the color light CL of the white light WL output from each of the first lenslets 131A and 131B are considered to be uniform in the illuminated region IRR, the optical intensity and illuminance in the region P2, where the color light CL of the white light WL output from the first lenslet 131A and the color light CL of the white light WL output from the first lenslet 131B overlap with each other in a duplex manner, are higher than the optical intensity and illuminance in the illuminated region IRR illuminated with only the color light CL of the white light WL output from each of the first lenslets 131A and 131B. When the optical intensity and illuminance of the color light CL of the white light WL output from each of the multiple first lenslets 131 are considered to be uniform in the illuminated region IRR, the optical intensity and illuminance in the region P3, where different kinds of color light CL of the white light WL output from the first lenslets 131 overlap with each other in a quadruple manner, are further higher than the optical intensity and illuminance in the region P2. In the illuminated region IRR, illuminance peaks are caused by the regions P2 and P3, that is, illuminance unevenness occurs.

Since the optical intensity and illuminance in each of the regions P2 and P3 are higher than the optical intensity and illuminance of the region P1, where different kinds of color light CL of the white light WL output from the multiple first lenslets 131 do not overlap with each other, the optical intensity and the illuminance in each of the regions P2 and P3 are suppressed to those comparable to those in the region P1 through correction made by a circuit of the projector 1. The correction made by a circuit of the projector 1 is made, for example, by adjusting and appropriately setting gains at locations corresponding to the regions P2 and P3 in the liquid crystal panel that constitutes each of the light modulators 4R, 4G, and 4B.

When the correction made by a circuit of the projector 1 is made, the peak of the optical intensity of the color light CL in the illuminated region IRR is detected. The detection of the peak of the optical intensity of the color light CL and the correction made by a circuit of the projector 1 are generally performed when adjustment of a variety of settings, alignment, fine adjustment, and fixation of a variety of parts are performed at the time of manufacturing the projector 1, as having been well known. Specifically, a person who makes the adjustment looks at a projection image for checking purposes projected from the projector 1, and adjusts the gains of the liquid crystal panel that constitutes each of the light modulators 4R, 4G, and 4B in such a way that the illuminance unevenness of the projection image is suppressed.

Although the gains of the liquid crystal panels of the light modulators 4R, 4G, and 4B are adjusted in advance at the time of manufacturing the projector 1, in a situation in which a user carries the projector 1, or installs the projector 1 at an installation base, or something hits the projector 1, for example, it is conceivable that the relative positions of the components accommodated in the internal space of the exterior body of the projector 1 are shifted from each other. Therefore, when the projector 1 includes an imager, an image or a video enlarged and projected from the projector 1 may be captured by the imager, whether illuminance unevenness has occurred in the projection image and the position of the illuminance unevenness may be detected, and the gains of the liquid crystal panel that constitutes each of the light modulators 4R, 4G, and 4B may be adjusted so as to suppress the illuminance unevenness based on the result of the detection.

In the projector 1, the controller 110 receives information on the luminance of the color light CL output from a second lenslet 132A as the first illumination light, information on the luminance of the color light CL output from a second lenslet 132B as the second illumination light, and information on the luminance in the overlapping regions where part of the color light CL output from the second lenslet 132A and part of the color light CL output from the second lenslet 132B overlap with each other in each of the image formation regions, that is, the illuminated region IRR. The controller 110 adjusts the gains of the liquid crystal panel that constitutes each of the light modulators 4R, 4G, and 4B based on the principle described above to adjust the luminance information in the image data corresponding to the overlapping regions.

The controller 110 identifies the regions P2 and P3, which are the overlapping regions, in accordance with the imaging result relating to the projection image captured by the imager 120, adjusts the gains of the pixels of each of the liquid crystal panels that are present in the identified overlapping regions, and adjusts the luminance information in the image data corresponding to the specified overlapping regions.

Figure 5:
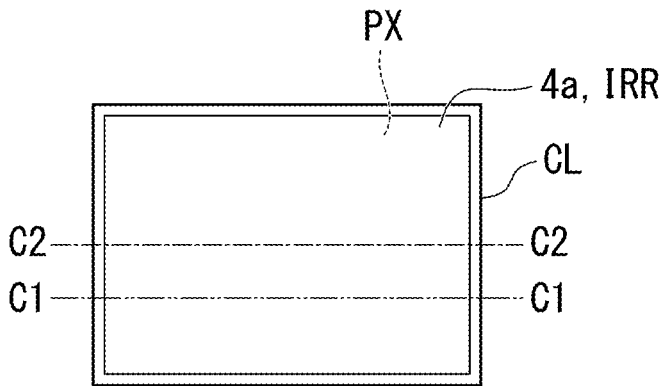
FIG. 5 is another schematic view of the part of the light incident surface of the light modulator of the projector shown in FIG. 1.
Figure 6:
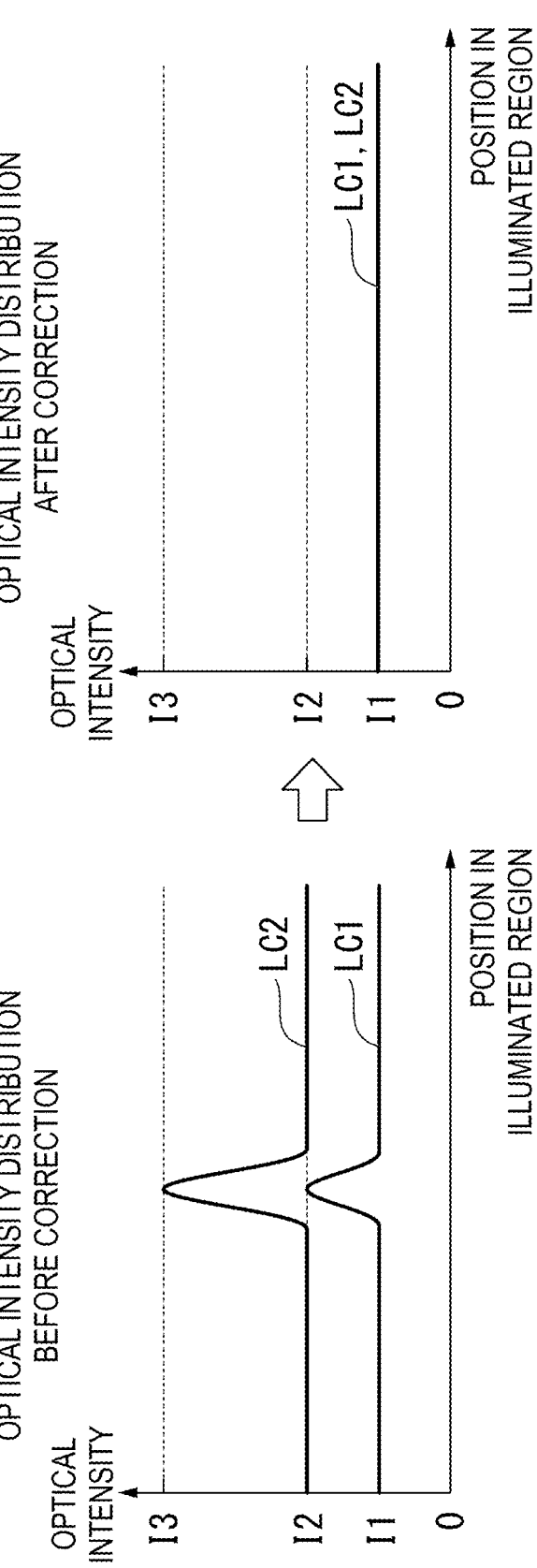
FIG. 6 is a diagrammatic view showing a principle of correcting the optical intensity in an illuminated region in the projector shown in FIG. 1.

FIG. 5 is a schematic view of the light incident surface 4*a* after the gains of the liquid crystal panel of each of the light modulators 4R, 4G, and 4B are adjusted with the image formation region of the light incident surface 4*a* viewed from the front side along the optical axis of the red light RL contained in the white light WL. FIG. 6 is a diagrammatic view showing the principle of suppressing the illuminance unevenness by homogenizing the optical intensity and illuminance in the illuminated regions of each of the light modulators 4R, 4G, and 4B in the illuminator 2 according to the present embodiment. The diagrammatic graphs on the left of FIG. 6 each show the optical intensity distribution before the correction. The diagrammatic graph on the right of FIG. 6 shows the optical intensity distribution after the correction. The horizontal axis for each of the distributions in FIG. 6 represents the positions in the illuminated region IRR. The vertical axis for each of the distributions in FIG. 6 represents the optical intensity of the color light CL, and means the total optical intensity of different kinds of color light CL overlapping with each other.

The optical intensity distribution of the color light CL along the line C1-C1 shown in FIGS. 4 and 5 is indicated by the graph on the left of FIG. 6 labeled with LC1. The optical intensity distribution of the color light CL along the line C2-C2 shown in FIGS. 4 and 5 is indicated by the graph on the left of FIG. 6 labeled with LC2. The optical intensity distribution of the color light CL indicated by the graph LC1 shows an optical intensity I1 corresponding to the region P1, and has a peak of an optical intensity I2 corresponding to the region P2. The optical intensity distribution of the color light CL indicated by LC2 shows the optical intensity I2 corresponding to the region P2, and has a peak of an optical intensity I3 corresponding to the region P3. Even when the optical intensities I2 and I3 higher than the optical intensity I1, which is the lowest optical intensity in the illuminated region IRR, are suppressed to the optical intensity I1 in accordance therewith, the optical intensity and illuminance of the color light CL in the illuminated region IRR can be homogenized at least to the optical intensity I1, as indicated by the graph on the right of FIG. 6. In the illuminated region IRR, the regions P2 and P3, where the optical intensities 12 and 13 are suppressed to the optical intensity I1, are smaller than the region P1. The loss of the color light CL in the liquid crystal panel of each of the light modulators 4R, 4G, and 4B is therefore small.

The illuminator 2 according to the present embodiment described above includes the light source 21, the collimator 22, the first lens array 34A, the second lens array 34B, and the superimposing lens (light condenser) 33. The light source 21 outputs the blue light (light) BL. The collimator 22 parallelizes the blue light BL output from the light source 21. The white light WL containing the blue light BL parallelized by the collimator 22 enters the first lens array 34A. The first lens array 34A includes multiple first lenslets 131. The white light WL output from the first lens array 34A enters the second lens array 34B. The second lens array 34B includes multiple second lenslets 132. The superimposing lens 33 focuses the color light CL contained in the white light WL output from the second lens array 34B at the image formation region of the light incident surface 4a of each of the light modulators 4R, 4G, and 4B as the illuminated region IRR. The white light WL output from each of at least two first lenslets 131 enters one second lenslet 132. The focal plane FPB of the multiple second lenslets 132 is located at a position upstream from the reference plane (imaginary plane) MPB containing the multiple contact points CT, where the first lenslets 131 adjacent to each other are in contact with each other in the first lens array 34A, in the optical path along which the white light WL and the color light CL travel.

In the illuminator 2 according to the present embodiment, in the illuminated region IRR corresponding to the image formation region of each of the light modulators 4R, 4G, and 4B, different kinds of color light CL, which are the sub-luminous fluxes into which the white light WL is divided by the multiple first lenslets 131 of the first lens array 34A, overlap with each other. The optical intensities 12 and 13 in the regions P2 and P3, where different kinds of color light CL overlap with each other, are at least higher than the optical intensity I1 in the region P1, where different kinds of color light CL do not overlap with each other. In the illuminator 2 according to the present embodiment, since a region where the optical intensity and illuminance are lower than the optical intensity and illuminance of one kind of color light CL is not provided between the regions illuminated with the multiple kinds of color light CL in the illuminated region IRR, a decrease in image quality can be suppressed without generation of a relatively dark portion in a projection image from the projector 1.

A configuration of Comparative Example as compared with the illuminator 2 according to the present embodiment may be a configuration in which the focal plane FPB of the multiple second lenslets 132 is located at a position downstream from the reference plane (imaginary plane) MPB in the optical path along which the white light WL travels, as the configuration disclosed in JP-A-2022-034731. In the configuration of Comparative Example, in the illuminated region IRR corresponding to the image formation region of each of the light modulators 4R, 4G, and 4B, a portion that is not illuminated with the color light CL is provided between the regions illuminated with different kinds of color light CL, which are the sub-luminous fluxes into which the white light WL is divided by the multiple first lenslets 131 of the first lens array 34A. In the configuration of Comparative Example, a portion that is not illuminated with the color light CL in the illuminated region IRR appears as a relatively dark portion in a projection image from the projector, and the illuminance unevenness is visually recognized by a viewer, but there is no way of correcting the dark portion to a bright portion, resulting in a decrease in image quality.

A configuration of Reference Example as compared with the illuminator 2 according to the present embodiment may be a configuration in which the focal plane FPB of the multiple second lenslets 132 is located at the same position as the reference plane (imaginary plane) MPB in the optical path along which the white light WL travels so that the focal plane FPB coincides with the reference plane MPB. In the configuration of Reference Example, the illuminated region IRR corresponding to the image formation region of each of the light modulators 4R, 4G, and 4B is illuminated with the color light CL, which are the sub-luminous fluxes into which the white light WL is divided by the multiple first lenslets 131 of the first lens array 34A, with no gap between different kinds of color light CL, so that there is not basically a portion that is not illuminated with the color light CL. The decrease in image quality can therefore suppressed without causing a relatively dark portion or illuminance unevenness to appear in a projection image from the projector. In the configuration of Reference Example, however, if the focal plane FPB is shifted to a position downstream from the reference plane MPB due to the accuracy of the arrangement or the tolerance of the assembly of the first lens array 34A and the second lens array 34B in the optical path along which the white light WL travels, and an impact applied when the projector is used, a situation similar to that caused by the configuration of Comparative Example occurs, so that the viewer visually recognizes illuminance unevenness, and a decrease in image quality cannot therefore be suppressed. Therefore, in the configuration of Reference Example, it is highly possible that a relatively dark portion appears in a projection image from the projector, so that a decrease in image quality cannot be completely removed.

In the illuminator 2 according to the present embodiment, part of the color light CL output from the second lenslet 132A (first illumination light), which is one of the multiple second lenslets 132, and part of the color light CL output from the second lenslet 132B (second illumination light), which is another of the multiple second lenslets 132, overlap with each other in the illuminated region IRR. The optical intensities 12 and 13 of the color light CL in the regions P2 and P3, where different types of color light CL output from the second lenslets 132A and 132B overlap with each other, are higher than the optical intensity I1 in the illuminated region IRR illuminated only with the color light CL output from the second lenslet 132A and the optical intensity I1 in the illuminated region IRR illuminated only with the color light CL output from the second lenslet 132B.

In the illuminator 2 according to the present embodiment, the optical intensities 12 and 13 of the color light CL in the regions P2 and P3, where different kinds of color light CL overlap with each other, are suppressed to the optical intensity I1 in the region P1, which is illuminated with only one kind of color light CL, so that the optical intensity and illuminance of the color light CL in the illuminated region IRR can be homogenized, for example, as described with reference to FIG. 6. To suppress the optical intensities 12 and 13 of the color light CL in the regions P2 and P3 to the optical intensity I1, for example, the correction made by a circuit of the projector 1 is used to adjust and appropriately set gains of locations corresponding to the regions P2 and P3 in the liquid crystal panel that constitutes each of the light modulators 4R, 4G, and 4B.

Figure 7:
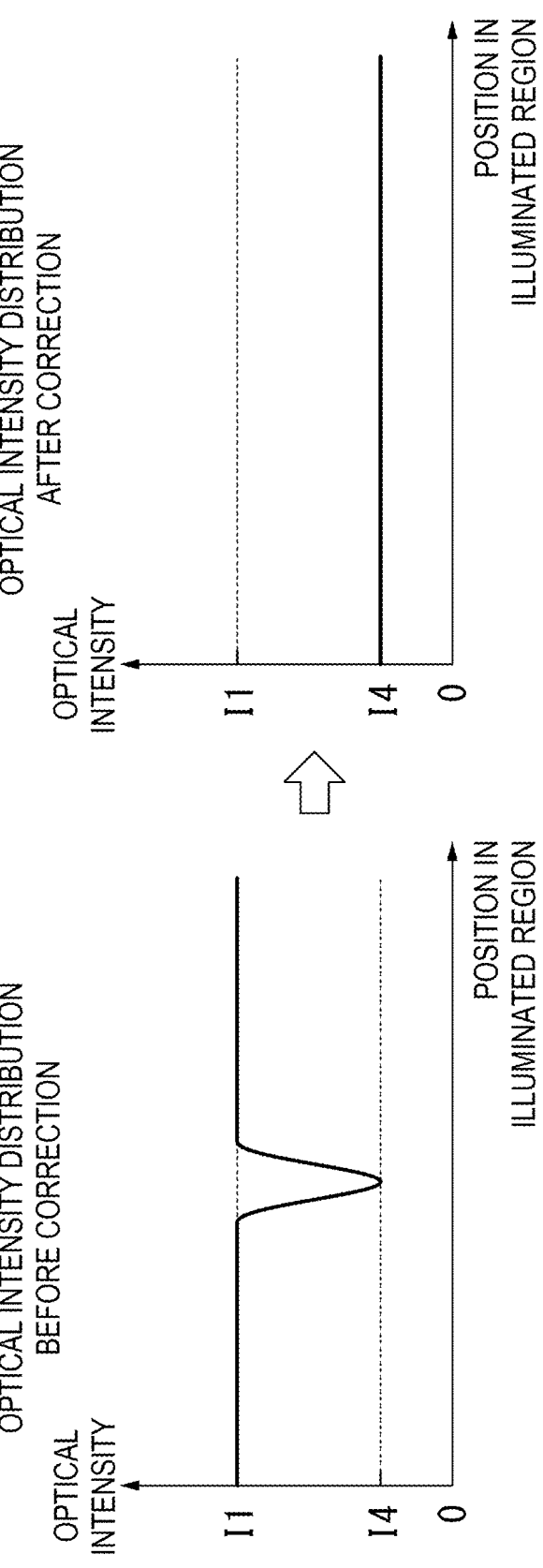
FIG. 7 is a diagrammatic view showing a principle of correcting the optical intensity in the illuminated region in a projector according to Comparative Example.

FIG. 7 is a diagrammatic view showing the principle of suppressing illuminance unevenness by homogenizing the optical intensity and illuminance in the illuminated regions of the light modulators 4R, 4G, and 4B in the configuration in which the focal plane FPB of the multiple second lenslets 132 is located downstream from the reference plane MPB as described above. The diagrammatic graph on the left of FIG. 7 shows the optical intensity distribution before the correction. The diagrammatic graph on the right of FIG. 7 shows the optical intensity distribution after the correction. The horizontal axis for each of the distributions in FIG. 7 represents the positions in the illuminated region IRR. The vertical axis for each of the distributions in FIG. 7 represents the optical intensity of the color light CL. In the configuration of Comparative Example, an optical intensity 14 in the region where different kinds of color light CL do not overlap with each other and which is not illuminated with the color light CL is lower than the optical intensity I1 in the region P1 illuminated with only one kind of color light CL, as shown in FIG. 7. The optical intensity 14 in the region that is not illuminated with the color light CL appears as a bottom of the distribution of the optical intensity I1, as indicated by the diagrammatic graph on the left of FIG. 7. To homogenize the optical intensity in the illuminated region IRR, for example, the correction made by a circuit of the projector 1 is used to suppress the optical intensity I1 to the optical intensity 14, as indicated by the diagrammatic graph on the right of FIG. 7. In the illuminated region IRR, the region P1, where the optical intensity I1 is suppressed to the optical intensity 14, is larger than the region that is not illuminated with the color light CL. A large amount of color light CL is therefore lost at the liquid crystal panel of each of the light modulators 4R, 4G, and 4B. On the other hand, in the illuminator 2 according to the present embodiment, in the illuminated region IRR, the regions P2 and P3, where the optical intensities 12 and 13 are suppressed to the optical intensity I1, are smaller than the region P1. The loss of the color light CL at the liquid crystal panel of each of the light modulators 4R, 4G, and 4B can therefore be suppressed to a small value.

In the illuminator 2 according to the present embodiment, the multiple first lenslets 131 each have the convex first lens surface (first curved surface) 131r. The multiple second lenslets 132 each have the convex second lens surface (second curved surface) 132r. The direction in which the first lens surface 131r protrudes may be the same as the direction in which the second lens surface 132r protrudes.

In the illuminator 2 according to the present embodiment, setting the size of the second lens surface 132r to an integral multiple of the size of the first lens surface 131r in a plane perpendicular to the optical axis AX2 allows the region segmentation illumination using the white light WL and the color light CL to be performed on the illuminated region IRR.

In the illuminator 2 according to the present embodiment, the multiple first lenslets 131 each have the convex first lens surface (first curved surface) 131r. The multiple second lenslets 132 each have the convex second lens surface (second curved surface) 132r. The direction in which the first lens surface 131r protrudes is opposite the direction in which the second lens surface 132r protrudes.

In the illuminator 2 according to the present embodiment, setting the size of the second lens surface 132r to an integral multiple of the size of the first lens surface 131r in a plane perpendicular to the optical axis AX2 allows the region segmentation illumination using the white light WL and the color light CL to be performed on the illuminated region IRR. In the illuminator 2 according to the embodiment, for example, the direction in which the first lens surface 131r protrudes is the direction toward the side on which the white light WL is incident in the optical axis AX2 along the Y-axis. The direction in which the second lens surface 132r protrudes is the direction toward the side via which the white light WL exits in the optical axis AX2 along the Y-axis, and is therefore the direction opposite the direction in which the first lens surface 131r protrudes.

The first lens array 34A and the second lens array 34B may be integrated with each other on the optical axis AX2. A transparent member having transparency to the white light WL and a certain length may be interposed between the first lens array 34A and the second lens array 34B in the optical axis AX2. When the first lens surface 131r protrudes toward the side on which the white light WL is incident and the second lens surface 132r protrudes toward the side via which the white light WL exits, as in the illuminator 2 according to the present embodiment, the first lens array 34A and the second lens array 34B can be readily integrated with each other.

Note that the direction in which the first lens surface 131r protrudes may be the direction toward the side via which the white light WL exits in the optical axis AX2, and that the direction in which the second lens surface 132r protrudes may be the direction toward the side on which the white light WL is incident in the optical axis AX2.

The projector 1 according to the present embodiment includes the illuminator 2 described above, the light modulators 4R, 4G, and 4B, and the projection system 6. The light modulator 4R modulates the red light RL contained in the white light WL output from the illuminator 2 to generate the red image light. The light modulator 4G modulates the green light GL contained in the white light WL to generate the green image light. The light modulator 4B modulates the blue light BL contained in the white light WL to generate the blue image light. The projection system 6 projects the image light (light) modulated by the light modulators 4R, 4G, and 4B.

The projector 1 according to the present embodiment causes the image formation region of the light incident surface 4a of each of the light modulators 4R, 4G, and 4B to undergo the region segmentation illumination using the color light CL contained in the white light WL output from the illuminator 2. In the projector 1 according to the present embodiment, in which the illuminated region IRR is the image formation region of each of the light modulators 4R, 4G, and 4B, a region where the optical intensity and illuminance are lower than the optical intensity and illuminance of one kind of color light CL is not provided between the regions illuminated with the multiple kinds of color light CL in the illuminated region IRR, and the optical intensity and illuminance of at least one kind of color light CL are secured in the illuminated region IRR, so that a decrease in image quality can be suppressed without generation of a relatively dark portion in a projection image.

In the projector 1 according to the present embodiment, the illuminated region IRR is the image formation region of each of the light modulators 4R, 4G, and 4B.

In the projector 1 according to the embodiment, in the illuminated region IRR, the optical intensities in the regions P2 and P3, where the multiple kinds of color light CL overlap with each other, can be readily adjusted, for example, by changing the gains of the liquid crystal panel that constitutes each of the light modulators 4R, 4G, and 4B.

The projector 1 according to the present embodiment further includes the controller 110, which controls the operation of driving the light modulators 4R, 4G, and 4B based on the luminance information in the image data. The controller 110 adjusts the luminance information in the image data corresponding to the overlapping regions, where part of the color light CL output from the second lenslet 132A (first illumination light), which is one of the multiple second lenslets 132, and part of the color light CL output from the second lenslet 132B (second illumination light), which is another of the multiple second lenslets 132, overlap with each other in the illuminated region IRR, that is the image formation region.

In the projector 1 according to the present embodiment, the controller 110 can adjust the gains of driven regions of each of the light modulators 4R, 4G, and 4B that correspond to the overlapping regions, where the color light CL output from the single second lenslet 132A and the color light CL output from the single second lenslet 132B overlap with each other in the illuminated region IRR. As a result, the projector 1 according to the present embodiment can favorably adjust the luminance information in the image data corresponding to the overlapping regions to suppress the illuminance unevenness in a projection image and therefore suppress a decrease in image quality.

The projector 1 according to the present embodiment further includes the imager 120, which captures a projection image containing the image light (light) projected by the projection system 6. The controller 110 identifies the overlapping regions in accordance with an imaging result captured by the imager 120, and adjusts the luminance information in the image data corresponding to the identified overlapping regions.

In the projector 1 according to the present embodiment, after the manufacture and assembly of the projector 1 are completed, the regions P2 and P3, which are the overlapping regions in the illuminated region IRR, can be identified in accordance with the result of the imaging performed by the imager 120, which captures a projection image actually projected onto the screen SCR. The controller 110 can be used to favorably adjust the luminance information in the image data corresponding to the overlapping regions. The projector 1 according to the present embodiment allows suppression of the illuminance unevenness in a projection image at a speed close to the real time at the time of use of the projector 1 and hence suppression of a decrease in image quality.

A preferable embodiment of the present disclosure has been described above in detail. The present disclosure is, however, not limited to the specific embodiment, and a variety of modifications and changes can be made to the embodiment within the scope of the substance of the present disclosure described in the claims.

For example, the shapes, the numbers, the arrangements, and the materials of the components of the illuminator and the projector are not limited to those described in the aforementioned embodiment and variations thereof, and may be changed as appropriate.

The projector according to the present disclosure may not include multiple light modulators and may instead be a single-panel projector including only one light modulator.

SUMMARY OF THE PRESENT DISCLOSURE

The present disclosure will be summarized below as additional remarks.

Additional remark 1: An illuminator including: a light source configured to output light; a collimator configured to parallelize the light output from the light source; a first lens array configured to receive the light parallelized by the collimator and including multiple first lenslets; a second lens array configured to receive light output from the first lens array and including multiple second lenslets; and a light condenser configured to focus light output from the second lens array at an illuminated region. The light output from each of at least two of the first lenslets is incident on one of the second lenslets. A focal plane of the multiple second lenslets is located in an optical path along which the light travels and located upstream from an imaginary plane containing multiple contact points where the first lenslets adjacent to each other in the first lens array are in contact with each other.

In the configuration according to the additional remark 1, in which a region where the optical intensity and illuminance are lower than the optical intensity and illuminance of one kind of color light is not provided between the regions illuminated with the multiple kinds of light in the illuminated region, a decrease in image quality can be suppressed without generation of a relatively dark portion in a projection image formed by the light output from the illuminator.

Additional remark 2: In the illuminator according to the additional remark 1, part of first illumination light output from one of the multiple second lenslets and part of second illumination light output from another of the multiple second lenslets overlap with each other in the illuminated region, and an optical intensity in a region where the first illumination light and the second illumination light overlap with each other is higher than the optical intensity in the illuminated region illuminated only with the first illumination light and the optical intensity in the illuminated region illuminated only with the second illumination light.

The configuration according to the additional remark 2, in which the optical intensity in the illuminated region is suppressed to the optical intensity in the region illuminated only with one kind of light, can homogenize the optical intensity and illuminance of the light in the entire illuminated region.

Additional remark 3: In the illuminator according to the additional remark 1 or 2, the multiple first lenslets each have a convex first curved surface, the multiple second lenslets each have a convex second curved surface, and a direction in which the first curved surface protrudes is the same as a direction in which the second curved surface protrudes.

The configuration according to the additional remark 3, in which the size of the second curved surface is set to an integral multiple of the size of the first curved surface in a plane perpendicular to an optical axis of the light, allows the region segmentation illumination using the light to be performed on the illuminated region.

Additional remark 4: In the illuminator according to the additional remark 1 or 2, the multiple first lenslets each have a convex first curved surface, the multiple second lenslets each have a convex second curved surface, and a direction in which the first curved surface protrudes is opposite a direction in which the second curved surface protrudes.

The configuration according to the additional remark 4, in which the size of the second curved surface is set to an integral multiple of the size of the first curved surface in the plane perpendicular to the optical axis of the light, allows the region segmentation illumination using the light to be performed on the illuminated region. When the direction in which the first curved surface protrudes is opposite the direction in which the second curved surface protrudes, with the first curved surface protruding toward the side on which the light is incident, the second curved surface protruding toward the side via which the light exits, the first and second lens arrays are readily integrated with each other in the direction along the optical axis.

Additional remark 5: A projector includes: the illuminator described above; a light modulator configured to modulate light output from the illuminator; and a projection optical apparatus configured to project the light modulated by the light modulator.

The configuration according to the additional remark 5, in which a region where the optical intensity and illuminance are lower than the optical intensity and illuminance of one kind of light is not provided between the regions illuminated with the multiple kinds of light in the illuminated region, secures the optical intensity and illuminance of at least the one kind of light in the illuminated region. A decrease in image quality can therefore be suppressed without causing a relatively dark portion to appear in a projection image.

Additional remark 6: In the projector according to the additional remark 5, the illuminated region is an image formation region of the light modulator.

The configuration according to the additional remark 6 can readily adjust the optical intensity in the region where the multiple kinds of light overlap with each other in the illuminated region, for example, by changing the gains of a liquid crystal panel that constitutes the light modulator.

Additional remark 7: The projector according to the additional remark 5 or 6 further includes a controller configured to control the operation of driving the light modulator based on luminance information in image data, and the controller is configured to adjust the luminance information in the image data corresponding to an overlapping region where part of first illumination light output from one of the multiple second lenslets and part of second illumination light output from another multiple second lenslets overlap with each other in the illuminated region.

The configuration according to the additional remark 7 allows the controller to adjust the gains of the driven region of the light modulator corresponding to the overlapping region, where the light output from a single second lenslet and the light output from another single second lenslet overlap with each other in the illuminated region. The configuration according to the additional remark 7 can favorably adjust the luminance information on the image data corresponding to the superposition region to suppress the illuminance unevenness in a projection image and suppress the decrease in the image quality.

Additional remark 8: The projector according to the additional remark 7 further includes an imager configured to capture a projection image containing the light projected by the projection system, and the controller is configured to identify the overlapping region in accordance with an imaging result captured by the imager, and adjust the luminance information in the image data corresponding to the identified overlapping region.

The configuration according to the additional remark 8, after the manufacture and assembly of the projector are completed, can identify the overlapping region in the illuminated region in accordance with the result of the imaging performed by the imager, which captures a projection image actually projected onto a screen or any other object. The controller can be used to favorably adjust the luminance information in the image data corresponding to the overlapping region. The configuration according to the additional remark 8 allows suppression of illuminance unevenness in a projection image at a speed close to the real time at the time of use of the projector and hence suppression of a decrease in image quality.

What is claimed is:

1. An illuminator comprising:
a light source configured to emit light;
a collimator configured to parallelize the light emitted from the light source;
a first lens array configured to receive the light parallelized by the collimator and including multiple first lenslets;
a second lens array configured to receive light emitted from the first lens array and including multiple second lenslets; and
a light condenser configured to focus light emitted from the second lens array at an illuminated region,
wherein the light emitted from each of at least two of the first lenslets is incident on one of the second lenslets,
a focal plane of the multiple second lenslets is located in an optical path along which the light travels and located upstream from an imaginary plane containing multiple contact points where the first lenslets adjacent to each other in the first lens array are in contact with each other.

2. The illuminator according to claim 1, wherein
part of first illumination light emitted from one of the multiple second lenslets and part of second illumination light emitted from another of the multiple second lenslets overlap with each other in the illuminated region, and
a third optical intensity in a region where the first illumination light and the second illumination light overlap with each other is higher than a first optical intensity in the illuminated region illuminated only with the first illumination light and a second optical intensity in the illuminated region illuminated only with the second illumination light.

3. The illuminator according to claim 1, wherein
the multiple first lenslets each have a convex first curved surface,
the multiple second lenslets each have a convex second curved surface, and
a direction in which the first curved surface protrudes is the same as a direction in which the second curved surface protrudes.

4. The illuminator according to claim 1,
wherein the multiple first lenslets each have a convex first curved surface,
the multiple second lenslets each have a convex second curved surface, and
a direction in which the first curved surface protrudes is opposite a direction in which the second curved surface protrudes.

5. A projector comprising:
the illuminator according to claim 1;
a light modulator configured to modulate light emitted from the illuminator; and
a projection optical apparatus configured to project the light modulated by the light modulator.

6. The projector according to claim 5,
wherein the illuminated region is an image formation region of the light modulator.

7. The projector according to claim 5, further comprising
a controller configured to control the operation of driving the light modulator based on luminance information in image data, wherein the controller is configured to adjust the luminance information in the image data corresponding to an overlapping region where part of first illumination light emitted from one of the multiple second lenslets and part of second illumination light emitted from another of the multiple second lenslets overlap with each other in the illuminated region.

8. The projector according to claim 7, further comprising an imager configured to capture a projection image containing the light projected by the projection system, wherein the controller is configured to identify the overlapping region in accordance with an imaging result captured by the imager, and is configured to adjust the luminance information in the image data corresponding to the identified overlapping region.

* * * * *